United States Patent
Park

(10) Patent No.: US 11,622,139 B2
(45) Date of Patent: Apr. 4, 2023

(54) BROADCAST RECEIVING DEVICE AND OPERATING METHOD THEREOF

(71) Applicant: SAMSUNG ELECTRONICS CO., LTD., Suwon-si (KR)

(72) Inventor: Seungho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/436,781

(22) PCT Filed: Feb. 17, 2020

(86) PCT No.: PCT/KR2020/002183
§ 371 (c)(1),
(2) Date: Sep. 7, 2021

(87) PCT Pub. No.: WO2020/184856
PCT Pub. Date: Sep. 17, 2020

(65) Prior Publication Data
US 2022/0174333 A1 Jun. 2, 2022

(30) Foreign Application Priority Data
Mar. 8, 2019 (KR) ........................ 10-2019-0027017

(51) Int. Cl.
*H04N 21/2385* (2011.01)
*H04H 60/76* (2008.01)
(Continued)

(52) U.S. Cl.
CPC ........ *H04N 21/2385* (2013.01); *H04H 60/76* (2013.01); *H04N 21/2353* (2013.01);
(Continued)

(58) Field of Classification Search
CPC ....... H04N 21/2385; H04N 21/234327; H04N 21/2353; H04N 21/440227;
(Continued)

(56) References Cited

U.S. PATENT DOCUMENTS 7,344,084 B2 * 3/2008 DaCosta ............ H04N 21/4126
348/E7.071
9,237,372 B2 * 1/2016 Dey .................... H04N 21/4331
(Continued)

FOREIGN PATENT DOCUMENTS

EP 3 223 519 A1 9/2017
KR 10-2013-0126538 11/2013
(Continued)

OTHER PUBLICATIONS

International Search Report and Written Opinion dated May 25, 2020 in corresponding International Application No. PCT/KR2020/002183.

(Continued)

*Primary Examiner* — Nnenna N Ekpo
(74) *Attorney, Agent, or Firm* — Nixon & Vanderhye P.C.

(57) ABSTRACT

A broadcast receiving device for receiving a transmitted service by using an MPEG Media Transport (MMT) protocol includes a tuner configured to receive Service Layer Signaling (SLS); a memory storing one or more instructions; and a processor configured to execute the one or more instructions stored in the memory to obtain information of one or more contents constituting the service, from an MMT Package (MP) table included in the SLS, determine whether there is second content that is the same as first content being currently received through a first transfer path and is received through a different transfer path from a transfer path of the first content, among the one or more contents, based on the information of the one or more contents, and (Continued)

```
MP_table() {
number_of_assets
for (i=0; i<N3; i++) { asset_location {
location_count
for (i=0; i<N4; i++) {
MMT_general_location_info()
}
} asset_descriptors {
asset_descriptors_length
for (j=0; j<N5; j++) {
asset_descriptors_byte;
}
}
}
``` perform, when there is the second content, a handoff of a content receiving channel from the first transfer path to a second transfer path corresponding to the second content to receive the second content.

11 Claims, 10 Drawing Sheets

(51) Int. Cl.
*H04N 21/2343* (2011.01)
*H04N 21/4402* (2011.01)
*H04N 21/462* (2011.01)
*H04N 21/61* (2011.01)
*H04N 21/647* (2011.01)
*H04N 21/235* (2011.01)

(52) U.S. Cl.
CPC ............ *H04N 21/234327* (2013.01); *H04N 21/440227* (2013.01); *H04N 21/4622* (2013.01); *H04N 21/6125* (2013.01); *H04N 21/64707* (2013.01)

(58) Field of Classification Search
CPC ........... H04N 21/4622; H04N 21/6125; H04N 21/64707; H04H 60/76
USPC ......................................................... 725/95
See application file for complete search history.

(56) References Cited

U.S. PATENT DOCUMENTS

| | | | |
|---|---|---|---|
| 9,544,641 | B2 | 1/2017 | Yie et al. |
| 9,930,086 | B2 | 3/2018 | Bouazizi et al. |
| 11,095,959 | B2 | 8/2021 | Yang et al. |
| 2016/0234532 | A1* | 8/2016 | Lee .................. H04N 21/64322 |
| 2017/0230707 | A1* | 8/2017 | Kim .................. H04N 21/6118 |
| 2018/0139477 | A1 | 5/2018 | Hong et al. |
| 2018/0262799 | A1 | 9/2018 | Xu et al. |
| 2019/0020707 | A1 | 1/2019 | Lee et al. |
| 2021/0289254 | A1* | 9/2021 | Uchimura ...... H04N 21/234309 |

FOREIGN PATENT DOCUMENTS

| | | |
|---|---|---|
| KR | 10-2016-0079074 | 7/2016 |
| KR | 10-2018-0001559 | 1/2018 |
| KR | 10-1863904 | 6/2018 |
| WO | 2016/129868 | 8/2016 |

OTHER PUBLICATIONS

ATSC Candidate Standard Revision: Signaling, Delivery, Synchronization, and Error Protection—Oct. 2018.
ISO/IEC 23008-1:2017(E) Information technology—High efficiency coding and media delivery in heterogeneous environments. Part 1: MPEG media transport (MMT)—2017.
Extended European Search Report dated May 4, 2022 for EP Application No. 20769597.4.
Lee et al., ISO/IEC JTC 1/SC 29/WG 11, "Enhancements for Mobile Environments" 120. XP 030023857.

* cited by examiner

MP_table() {
number_of_assets
for (i=0; i<N3; i++) { asset_location {
location_count
for (i=0; i<N4; i++) {
MMT_general_location_info()
}
} asset_descriptors {
asset_descriptors_length
for (j=0; j<N5; j++) {
asset_descriptors_byte;
}
}
}
```

FIG. 4

```
                                              ,-410
number_of_assets = 1
for ( I = 0; I < 1 ; i++){
location_count = 2;
for (j = 0; j < 2; j++)
{
MMT_general_location_info();
}
}
MMT_general_location_info1(){
    Location_type = 1;
}
MMT_general_location_info2(){
    Location_type = 5;
}
```

FIG. 5

```
                                                    510
number_of_assets = 2
for ( I = 0; I < 2 ; i++){
location_count = 1;
for (j = 0; j < 1; j++)
{
MMT_general_location_info();
}
If(I == 1){
asset_descriptors {
asset_descriptors_length N5
for (j=0; j<N5; j++) {
asset_descriptors_byte;
}
}
}
}
#LOCATION INFORMATION OF ASSET 1
MMT_general_location_info(){
        Location_type = 1;
}
#LOCATION INFORMATION OF ASSET 2
MMT_general_location_info(){
        Location_type = 5;
}
asset_descriptors {
asset_descriptors_length N5
for (j=0; j<N5; j++) {
asset_descriptors_byte;
}
}
```

FIG. 6

```
                                              ,-610
MMT_general_location_info() {
location_type
if (location_type == 0x00) {
packet_ id
} else if (location_type == 0x01) {
ipv4_src_addr
ipv4_dst_addr
dst_port
packet_ id
} else if (location_type == 0x02) {
.
.
.
} else if (location_type == '0x05') {
URL_length N1
for (i=0; i<N1; i++) {
URL_byte
}
} else if (location_type == '0x06') {
length N2
for (i=0;i<N2;i++) {
byte
}
}
else if(location_type == '0x0C') {
}
}
```

FIG. 7

```
<?xml version="1.0" encoding="UTF-8"?>
<MPD xmlns:xsi="http://www.w3.org/2001/XMLSchema-instance"
   xmlns="urn:mpeg:DASH:schema:MPD:2011"
   xsi:schemaLocation="urn:mpeg:DASH:schema:MPD:2011"
  <BaseURL>http://www.test.ac.at/ftp/datasets/mmsys12/BigBuckBunny/bunny_15s/</BaseURL>
    <AdaptationSet bitstreamSwitching="true">
     <Representation id="0" codecs="avc1" mimeType="video/mp4" width="320" height="240" startWithSAP="1" bandwidth="45351">
        <SegmentURL media="bunny_15s_50kbit/bunny_15s1.m4s"/>
```

| BroadbandComponent | 0.1 | | A description about the contents components of ATSC 3.0 Service delivered by broadband |
|---|---|---|---|
| @fullMPDUri | 1 | anyURI | Reference to an MPD fragment which contains descriptions for contents components of the ATSC 3.0 Service delivered over broadband |
| BroadbandComponentInfo | 0..N | | A description about the contents |
| @RepId | 1 | StringNoWhite space | Representation ID of the DASH Representation delivered by broadband |
| @SimulcastAssetId | 0..1 | String | Asset id of an MPU component carrying the same content with the DASH Representation |

# BROADCAST RECEIVING DEVICE AND OPERATING METHOD THEREOF

CROSS-REFERENCE TO RELATED APPLICATIONS

This application is a national stage of International Application No. PCT/KR2020/002183 designating the United States, filed on Feb. 17, 2020, in the Korean Intellectual Property Receiving Office and claiming priority to Korean Patent Application No. 10-2019-0027017, filed on Mar. 8, 2019, in the Korean Intellectual Property Office, the disclosures of which are incorporated by reference herein in their entireties.

BACKGROUND

Field

The disclosure relates to a broadcast receiving device and an operating method thereof, and for example, to a broadcast receiving device capable of providing a handoff function in receiving transmitted broadcast content by using an MPEC Media Transport (MMT) protocol, and an operating method of the broadcast receiving device.

Description of Related Art

A broadcast receiving device is a device having a function of receiving broadcast images that users can view and displaying the broadcast images. A user can watch broadcasts through the broadcast receiving device. The broadcast receiving device displays a broadcast selected by a user from among broadcast signals sent from a broadcasting station on a display.

Also, smart TVs providing various contents in addition to a broadcasting function are provided. The smart TVs are aimed to analyze and provide what a user desires without having to receive the user's control, instead of operating passively according to the user's selection.

Meanwhile, ATSC 3.0, which is a digital TV broadcast standard is a North American next-generation broadcast standard having features of a high data rate, a network convergence service, etc., and has been adopted as a national UHD broadcast standard. ATSC 3.0 uses a Real-Time Object Delivery over Unidirectional Transport (ROUTE) protocol and an MMT protocol as transport standards. In the case of the ROUTE protocol, a standard for handoff has been specified in the ATSC 3.0 S33-1 standard. However, in the case of the MMT protocol, no standard for handoff has been specified. Accordingly, because the MMT protocol has no method for specifying that content transmitted through a broadcast and content transmitted through a broadband are the same contents, the MMT protocol cannot support a handoff function.

SUMMARY

Embodiments of the disclosure provide a broadcast receiving device capable of supporting a handoff function, using Service Layer Signaling (SLS), when receiving a transmitted broadcast service using an MMT protocol, and an operating method of the broadcast receiving device.

Embodiments of the disclosure provide a method capable of matching the same contents among contents transmitted through different transfer paths, using information included in service layer signaling, when receiving a transmitted broadcast service using an MMT protocol.

Accordingly, when no broadcast can be received through a current transfer path of receiving content, handoff to another transfer path may be performed to continue to receive the same content, thereby assuring users of stable broadcast viewing.

A broadcast receiving device for receiving a transmitted service using an MPEG Media Transport (MMT) protocol, according to an example embodiment, includes: a tuner configured to receive MMT Service Layer Signaling (SLS); a memory storing one or more instructions which, when executed, cause a processor to be configured to: obtain information of one or more contents of the service, from an MMT Package (MP) table included in the MMT SLS, determine whether there is second content that is the same as first content being currently received through a first transfer path and received through a different transfer path from the first transfer path of the first content among the one or more contents based on the information of the one or more contents, and perform, based on there being the second content, a handoff of a content receiving channel from the first transfer path to a second transfer path corresponding to the second content to receive the second content.

The first transfer path and the second transfer path, according to an example embodiment, may be any one of a broadcast and a broadband.

The processor according to an example embodiment may be configured to obtain the information of the one or more contents from number_of_assets data, asset_location data, and asset_descriptors data included in the MP table.

The processor according to an example embodiment may be configured to determine whether there is the second content among at least one content classified into the same asset as the first content, based on the asset_location data.

The processor according to an example embodiment may be configured to determine whether there is the second content, by determining whether location_count data in the asset_location data for the first content is 2 or more.

The processor according to an example embodiment may be configured to determine whether there is the second content among at least one content classified into a different asset from the first content, based on the number_of_assets data, the asset_location data, and the asset_descriptors data.

The processor according to an example embodiment may be configured to: identify, based on there being the second content, content matching with the second content from among one or more contents having the second transfer path, and receive the identified content through the second transfer path.

The processor according to an example embodiment may be configured to: obtain a reference for a Media Presentation Description (MPD) from a User Service Bundle Description (USBD) fragment included in the MMT SLS, control a communicator to receive the MPD based on the reference for the MPD and obtain identification information for one or more contents received through the second transfer path from the MPD, and identify the content matching with the second content from among one or more contents received through the second transfer path, based on the identification information and information about the second content.

The processor according to an example embodiment may be configured to: identify the content matching with the second content from among the one or more contents received through the second transfer path based on URL information about the one or more contents included in the MPD and URL information about the second content.

The processor according to an example embodiment may be configured to perform the handoff based on a broadcast receiving environment and a user input.

A method of operating a broadcast receiving device to receive a transmitted service using an MPEG Media Transport (MMT) protocol, according to an example embodiment, includes: receiving MMT Service Layer Signaling (SLS); obtaining information of one or more contents of the service from an MMT Package (MP) table included in the MMT SLS; determining whether there is second content that is the same as first content being currently received through a first transfer path and received through a different transfer path from a transfer path of the first content among the one or more contents, based on the information of the one or more contents; and performing, based on there being the second content, a handoff of a content receiving channel from the first transfer path to a second transfer path corresponding to the second content, and receiving the second content.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 3 is a diagram illustrating an MP table included in SLS according to various embodiments;

FIG. 4 is a diagram illustrating an example method of determining whether a handoff is possible in a broadcast receiving device according to various embodiments;

FIG. 5 is a diagram illustrating an example method of determining whether a handoff is possible in a broadcast receiving device according to various embodiments;

FIG. 6 is a diagram illustrating example location type information included in an MP table according to various embodiments;

FIG. 7 is a diagram illustrating an example MDP according to various embodiments;

FIG. 8 is a chart illustrating a part of a USBD fragment received by a broadcast receiving device according to various embodiments;

DETAILED DESCRIPTION

Figure 1:
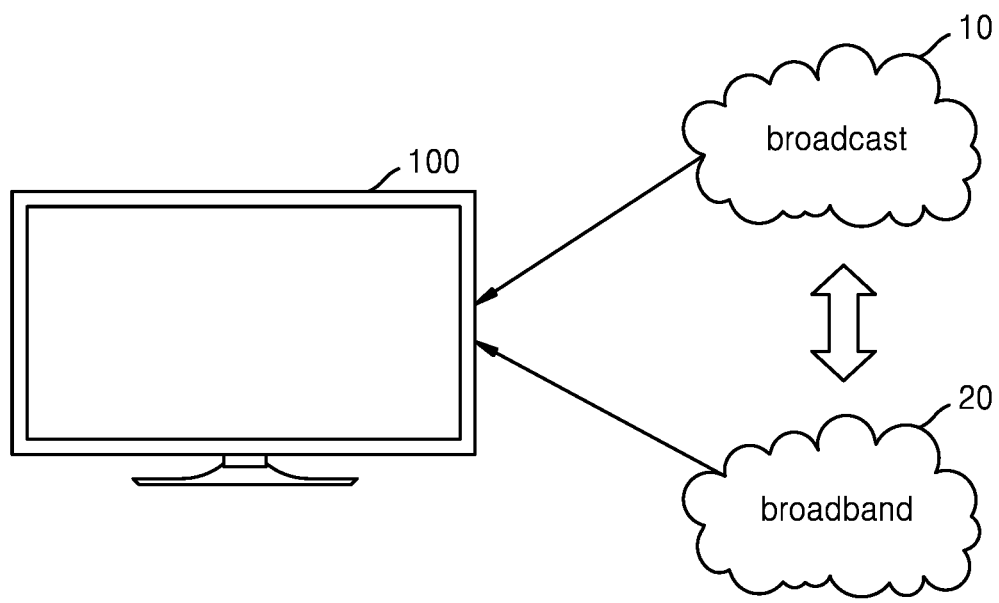
FIG. 1 is a diagram illustrating an example broadcast receiving device according to various embodiments.

Terms used in this disclosure will be briefly described, and the disclosure will be described in greater detail.

Although general terms being widely used were selected as terminology used in the disclosure while considering the functions of the disclosure, they may vary according to intentions of one of ordinary skill in the art, judicial precedents, the advent of new technologies, and the like. Terms may be arbitrarily selected. In this case, their meanings will be described in detail in the detailed description of the disclosure. Hence, the terms used in the disclosure are defined based on the meanings of the terms and the contents of the entire disclosure, not by simply stating the terms themselves.

It will be understood that when a certain part "includes" a certain component, the part does not exclude another component but can further include another component, unless the context clearly dictates otherwise. As used herein, the terms "portion", "module", or "unit" refers to a unit that can perform at least one function or operation, and may be implemented as hardware, software, or a combination of hardware and software.

Hereinafter, embodiments of the present disclosure will be described in detail with reference to the appended drawings. However, the present disclosure can be implemented in various different forms, and is not limited to the embodiments described herein. In the drawings, portions irrelevant to the description may not be shown to simplify the disclosure, and throughout the disclosure, similar components are assigned similar reference numerals.

FIG. 1 is a diagram illustrating an example broadcast receiving device according to various embodiments.

A broadcast receiving device 100 according to an embodiment may be a TV, but this is only an embodiment. The broadcast receiving device 100 may be implemented as an electronic device capable of receiving a broadcast signal and displaying an image based on the broadcast signal. For example, the broadcast receiving device 100 may be implemented as various electronic devices, such as a mobile phone, a tablet PC, a digital camera, a camcorder, a laptop computer, a desktop, an e-book terminal, a digital broadcast terminal, a Personal Digital Assistant (PDA), a Portable Multimedia Player (PMP), a navigation, an MP3 player, a wearable device, etc. Particularly, the embodiments may be easily implemented in a display device having a large display, such as a TV, although not limited thereto.

The broadcast receiving device 100 may be a stationary type or a mobile type, or may be a digital broadcast receiving device capable of receiving digital broadcasts. Also, the broadcast receiving device 100 may be implemented as a flat display device, a curved display device having a curvature, or a flexible display device having an adjustable curvature An output resolution of the broadcast receiving device 100 may be, for example, High Definition (HD), Full HD, Ultra HD, or higher.

In various embodiments, the term "user" may refer to a person who controls the functions or operations of the broadcast receiving device 100 using a controller, and may include a viewer, a manager, an installation engineer, etc.

The broadcast receiving device 100 may receive a service through a broadcast 10 or a broadband 20. The service according to an embodiment may include at least one component. A service may be a group of media components that are provided to a user, and the components may have various formats of media. Also, a service may be provided continuously or intermittently, and in real time or non-real-time. A real-time service may be configured with a series of TV programs. Also, a service according to an embodiment may include a broadcast service, and the broadcast service may include one or more contents.

For example, referring to FIG. 1, a service provided to the broadcast receiving device 100 according to an embodiment may include first content transmitted through the broadcast 10 and second content transmitted through the broadband 20. In this case, the first content and the second content may be the same contents transmitted through different transfer paths.

The broadcast receiving device 100 according to an embodiment may perform a handoff based on a broadcast reception environment or a user input. For example, when the broadcast receiving device 100 has difficulties in receiving content through a broadcast, while receiving and reproducing first content through the broadcast, the broadcast receiving device 100 may perform a handoff from the broadcast to a broadband. The broadcast receiving device 100 may receive second content that is the same as the first content through the broadband, and reproduce the second content.

The broadcast receiving device 100 according to an embodiment may receive Service Layer Signaling (SLS). The SLS may be signaling information describing characteristics about the corresponding service, and may provide information for obtaining the corresponding service and components (for example, contents) included in the corresponding service.

For example, the broadcast receiving device 100 may obtain information about first content and second content from MPEG Media Transport (MMT) SLS, and determine that the first content and the second content are the same contents having different transfer paths, based on the obtained information. When it is determined that the first content and the second content are the same contents, and the first content is content transmitted through the broadcast 10 while the second content is content transmitted through the broadband 20, the broadcast receiving device 100 according to an embodiment may identify content matching with the second content from among contents transmitted through the broadband 20. After the broadcast receiving device 100 identifies the content matching with the second content, the broadcast receiving device 100 may perform a handoff between the broadcast 10 and the broadband 20 to receive the identified content.

Figure 2:
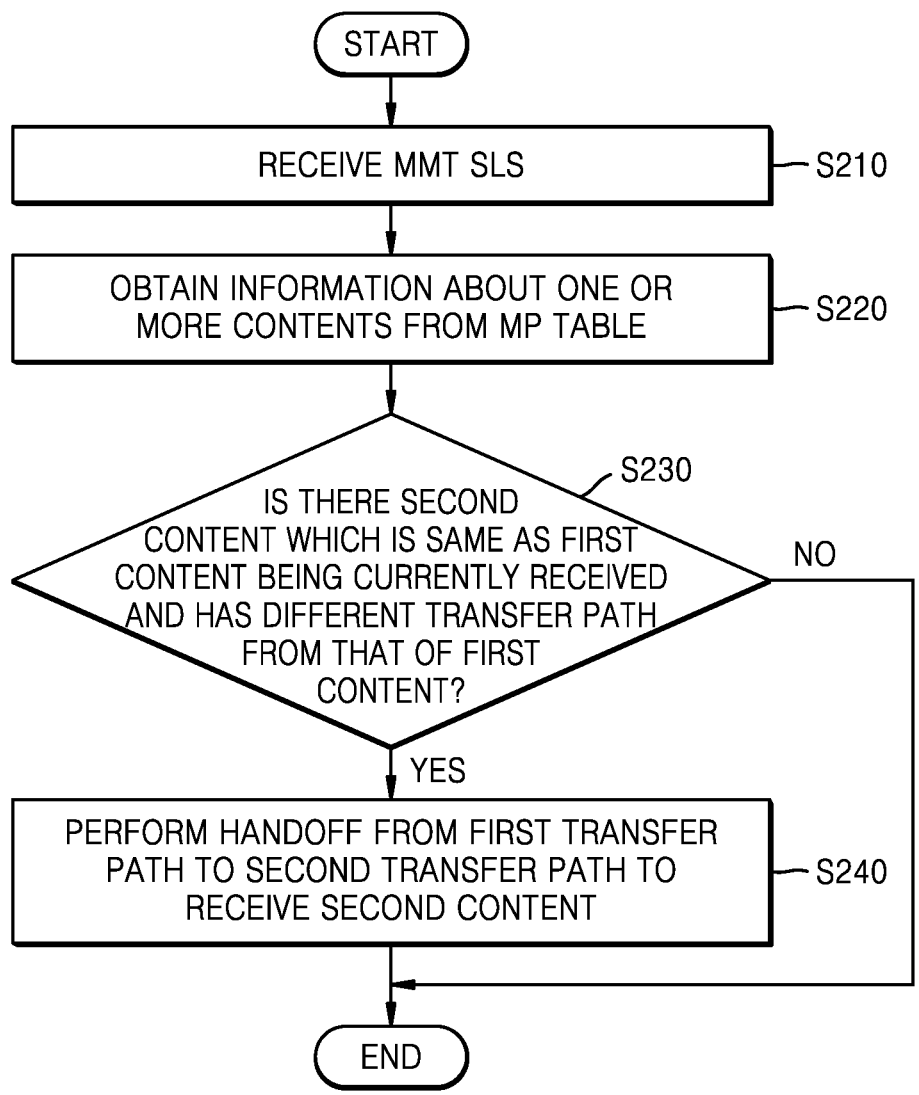
FIG. 2 is a flowchart illustrating an example method of operating a broadcast receiving device according to various embodiments.

FIG. 2 is a flowchart illustrating an example method of operating a broadcast receiving device according to various embodiments.

Referring to FIG. 2, the broadcast receiving device 100 according to an embodiment may receive SLS (S210). The SLS may be MMT SLS. The SLS may include a User Service Bundle Description (USBD) fragment and an MMT Package (MP) table. The USBD fragment may provide an identifier of a service and reference information about another SLS required for obtaining components of the corresponding service. The USBD fragment may provide reference information about the MP table, and the MP table may provide information about an MMT protocol session through which the service is transmitted and information about an asset that is transmitted through the MMT protocol session.

The broadcast receiving device 100 may obtain information about one or more contents of the service from the MP table included in the SLS (S220). For example, the MP table may include the number number_of_assets of assets, location information asset_location of assets, and descriptors asset_descriptors for assets. Herein, an asset may be a multimedia data entity, and may refer to a component of a service.

The broadcast receiving device 100 may determine whether there is second content which is the same as first content being currently received and has a different transfer path from that of the first content, based on the information about the one or more contents (S230).

For example, the broadcast receiving device 100 may obtain asset_location data from the MP table. The broadcast receiving device 100 may determine whether there is second content which is the same as first content being currently received and is received through a different transfer path from that of the first content, based on location_count data included in the asset_location data. The location_count data may be data providing the number of pieces of location information for an asset. When location_count is '1', it may refer, for example, to content (an asset) being transmitted through a transfer path. When location_count data is '2' or more, it may refer, for example, to the same content being able to be transmitted through two or more transfer paths. The broadcast receiving device 100 may determine whether the location_count data is '2' or more, thereby determining whether a handoff is possible.

The broadcast receiving device 100 may check number_of_assets data from the MP table, wherein the number_of_assets data may be data providing the number of assets of which information is provided by the MP table. For example, when the number_of_assets data is '2', information of two assets (a first asset and a second asset) may be provided by the MP table. In this case, when the first asset and the second asset are the same contents (assets), at least one of a descriptor asset_descriptors for the first asset and a descriptor asset_descriptors for the second asset may represent that the first asset and the second asset are the same contents (assets).

When there are a plurality of assets of which information is provided by the MP table, the broadcast receiving device 100 may determine whether the assets are the same contents, based on descriptors for the assets.

When there is the second content which is the same as the first content being currently received and which is received through a different transfer path from that of the first content, the broadcast receiving device 100 may perform a handoff of a content receiving channel from a first transfer path (a path through which the first content is received) to a second transfer path (a path through which the second content is received) to receive the second content (S240).

When there is the second content received through the second transfer path, the broadcast receiving device 100 according to an embodiment may obtain information about one or more contents transmitted through the second transfer path. For example, the broadcast receiving device 100 may download a Media Presentation Description (MPD). In this case, the broadcast receiving device 100 may download the MPD using a @fullMPDUri element of broadbandComponent in the USBD fragment included in the SLS. The @fullMPDUri element may represent a reference for a MPD fragment including descriptions about service components (one or more contents) transmitted through a broadband.

When the second transfer path is a broadband, the broadcast receiving device 100 according to an embodiment may obtain identification information about one or more contents received through the broadband from the MPD, and identify content matching with the second content from among the one or more contents received through the broadband, based on the identification information and information about the second content.

After the content matching with the second content is identified, the broadcast receiving device 100 may perform a handoff of a content receiving channel from the first transfer path to the second transfer path, receive the identified content, and reproduce the content.

FIG. 3 is a diagram illustrating an example MP table included in SLS according to various embodiments.

Referring to FIG. 3, an MP table 310 may include information of one or more assets (contents) of a service. For example, as illustrated in FIG. 3, the MP table 310 may include the number number_of_assets of assets, location information asset_location of assets, and descriptors asset_descriptors for assets. The number number_of_assets of assets may be data providing the number of assets of which information is provided by the MP table 310.

The location information asset_location of assets may include location_count data and MMT_general_location_info data. In this case, the location_count data may be data providing the number of pieces of location information about an asset, and the MMT_general_location_info data may be data providing location information of an asset.

The descriptors asset_descriptors for assets may be data providing descriptions about assets.

FIG. 4 is a diagram illustrating an example method of determining whether a handoff is possible in a broadcast receiving device according to various embodiments.

Referring to FIG. 4, an MP table 410 according to an embodiment may provide information about an asset. For example, when information about an asset is provided by the MP table 410, number_of_assets data included in the MP table 410 may represent '1', although not limited thereto.

An asset included in an MP table may have identification information, and an asset included in the MP table 410 of FIG. 4 may have first identification information (for example, asset ID=0). An asset may include one or more pieces of location information.

The broadcast receiving device 100 according to an embodiment may determine whether a handoff is possible, based on the number number_of_assets of pieces of location information included in an asset. For example, the broadcast receiving device 100 may determine whether the number of pieces of location information included in an asset is '2' or more, and when the number of pieces of location information is '2' or more, the broadcast receiving device 100 may determine that a handoff is possible.

As illustrated in FIG. 4, an asset may have two pieces of location information. That an asset has two pieces of location information may refer, for example, to the same content being able to be transmitted through two transfer paths.

When an asset has two pieces of location information, location_count data for the asset may be represented as '2', and two pieces of MMT_general_location_info data for the asset may be provided. For example, the location information may include first location information MMT_general_location_info1 and second location information MMT_general_location_info2, as illustrated in FIG. 4.

For example, an asset (the same content) may include first content that is receivable through a first transfer path corresponding to the first location information and second content that is receivable through a second transfer path corresponding to the second location information, wherein the first content and the second content may be the same contents transmitted through different paths.

The broadcast receiving device 100 according to an embodiment may identify an asset asset 1 corresponding to the first content using identification information (for example, asset ID=0) of an asset corresponding to content (for example, the first content) being currently received. When the identified asset asset 1 has two or more pieces of location information, it may refer, for example, to the same content (for example, the second content) having a different transfer path as that of the first content exists. Therefore, the broadcast receiving device 100 may determine that a handoff is possible.

The location information may include location type information location_type. The location type information location_type may be data representing a type of location information. For example, when location_type data of the first location information is '1(0x01)', it may refer, for example, to transfer path information (first location information) of the asset being represented in the form of 'MMTP packet flow over UDP/IP(version 4)'. Also, when location_type data of the second location information is '5(0x05)', it may refer, for example, to transfer path information (second location information) of the asset being represented in the form of a 'URL', although not limited thereto.

FIG. 5 is a diagram illustrating an example method of determining whether a handoff is possible in a broadcast receiving device according to various embodiments.

Referring to FIG. 5, an MP table 510 according to an embodiment may provide information about two or more assets. For example, number_of_assets data included in the MP table 510 may represent '2'.

The broadcast receiving device 100 according to an embodiment may determine whether a handoff is possible, based on location information asset_location and descriptors asset_descriptors included in two or more assets.

For example, as illustrated in FIG. 5, when the broadcast receiving device 100 determines that two assets asset 1 (for example, 'I=0') and asset 2 (for example, 'I=1') are the same contents having different transfer paths, based on location information asset_location and descriptors asset_descriptors for the two assets, the broadcast receiving device 100 may determine that a handoff is possible.

As illustrated in FIG. 5, each of the two assets may have one piece of location information (for example, location_count=1'), wherein a type of location information of a first asset asset 1 may be '1(0x01)' and a type of location information of a second asset asset 2 may be '5(5x05)'. The first asset and the second asset may have different transfer paths.

For example, contents classified into the same asset while having different transfer paths may be determined to be the same contents, whereas, in the case of contents classified into different assets (for example, asset 1 and asset 2) while having different transfer paths, it may need to be determined whether the contents are the same contents.

An MP table according to an embodiment may include a descriptor asset_descriptors for the second asset asset 2 (I=1).

For example, the descriptor for the second asset may be data providing a description about the second asset, and may include a description representing that the second asset is the same asset (content) as the first asset.

Accordingly, when there are a plurality of assets (for example, the first asset and the second asset), the broadcast receiving device 100 may determine whether contents classified into different assets are the same contents, based on descriptor data asset_descriptors for the assets. When descriptor data for the first asset or the second asset includes a description representing that the first asset (asset 1, I=0) and the second asset (asset 2, I=1) are the same assets, the broadcast receiving device 100 may determine that the first asset (first content) having the first location information and the second asset (second content) having the second location information are the same contents.

When an asset (the first asset) corresponding to content (the first content) being currently received and the second asset (the second content) classified into a different asset are the same contents, and a transfer path of the first asset is different from a transfer path of the second asset, the broadcast receiving device 100 according to an embodiment may determine that a handoff is possible.

The broadcast receiving device 100 according to an embodiment may determine, as described above with reference to FIGS. 4 and 5, whether there is second content that is the same as the first content being currently received and has a different transfer path from that of the first content (whether a handoff is possible), and, when it is determined that there is the second content (when it is determined that a handoff is possible), the broadcast receiving device 100 may identify content matching with the second content from among one or more contents transmitted through the different transfer path. This will be described in greater detail below with reference to FIGS. 6 and 7.

FIG. 6 is a diagram illustrating example location type information included in an MP table according to various embodiments.

When a first location information type for the same assets (contents) is '0(0x01)' and a second location information type for the same assets (contents) is '5(0x05)', the broadcast receiving device 100 according to an embodiment may receive the contents through a first transfer path corresponding to the first location information type or through a second transfer path corresponding to the second location information type.

Referring to FIG. 6, an MP table 610 according to an embodiment may include different pieces of location information data according to location information types. For example, when a location information type is '0(0x00)', the MP table 610 may include packet_id data, and, when a location information type is '5(0x05)', the MP table 610 may include URL_length data and URL_byte data.

When content (first content) being currently received is received through the first transfer path corresponding to the first location information type (for example, '1(0x01)'), the broadcast receiving device 100 according to an embodiment may identify content matching with content (second content that is the same as the first content and has the second transfer path) having the second location information type from among at least one content that is receivable through the second transfer path corresponding to the second location information type (for example, '5(0x05)').

FIG. 7 is a diagram illustrating an example MDP according to various embodiments.

The broadcast receiving device 100 according to an embodiment may obtain information about one or more contents transmitted through a second transfer path. For example, the broadcast receiving device 100 may download a Media Presentation Description (MPD) 710. At this time, the broadcast receiving device 100 may download the MPD 710 using a @fullMPDUri element of broadbandComponent in a USBD fragment included in SLS. The @fullMP-DUri element may represent a reference for an MPD fragment including presentation descriptions for service components (one or more contents) transmitted through a broadband.

The broadcast receiving device 100 according to an embodiment may obtain identification information for one or more contents received through a broadband, from an MPD, and identify content matching with second content from among the one or more contents received through the broadband, based on the identification information and information about the second content.

For example, the broadcast receiving device 100 may identify content matching with second content from among one or more contents (one or more contents included in the MPD) that are receivable through a second transfer path (for example, a broadband), based on second location information (for example, URL_length data and URL_byte data) of the second content (asset) included in the MP table of FIG. 6 and URL information (for example, at least one of Base URL information and Segment URL information) for one or more contents included in the MPD of FIG. 7. For example, when the URL_byte data of the second content is "abcde", a Base URL of third content among the one or more contents included in the MPD is "abc", and Segment URL is "de", the broadcast receiving device 100 may identify the third content as content matching with the second content. However, a method of identifying matching content is not limited to this, and matching content may be identified by various methods.

FIG. 8 is a chart illustrating a part of a USBD fragment received by a broadcast receiving device according to various embodiments.

The broadcast receiving device 100 according to an embodiment may receive SLS, wherein the SLS may be MMT SLS. The SLS may include a User Service Bundle Description (USBD) fragment. The USBD fragment may provide an identifier of a service and reference information about another SLS required for obtaining components of the corresponding service.

In the USBD fragment included in the SLS according to an embodiment, broadbandComponent may include a @fullMPDUri element, and broadbandComponentInfo may include a @RepId element and a @SimulcastAssetId element.

The @fullMPDUri element may represent a reference for an MPD fragment including descriptions about service components (one or more contents) transmitted through a broadband.

The @RepId element may represent identification information (for example, ID) of content transmitted through the broadband, and the @SimulcastAssetId element may represent identification information (for example, Asset ID) corresponding to the same content as the content transmitted through the broadband.

The broadcast receiving device 100 may identify the same contents as contents transmitted through the broadband by Asset ID, based on @RepId element data and @SimulcastAssetId element data.

For example, the broadcast receiving device 100 may determine Asset ID corresponding to content being currently received from an MP table, and determine identification information of content that is the same as the content having the determined Asset ID and is transmitted through a broadband, based on the @SimulcastAssetId element data and @RepId element data. The broadcast receiving device 100 may identify content that is the same as the content being currently received and is transmitted through the broadband, based on the determined identification information and identification information included in an MPD. The broadcast receiving device 100 may perform a handoff to receive the identified content through the broadband.

Figure 9:
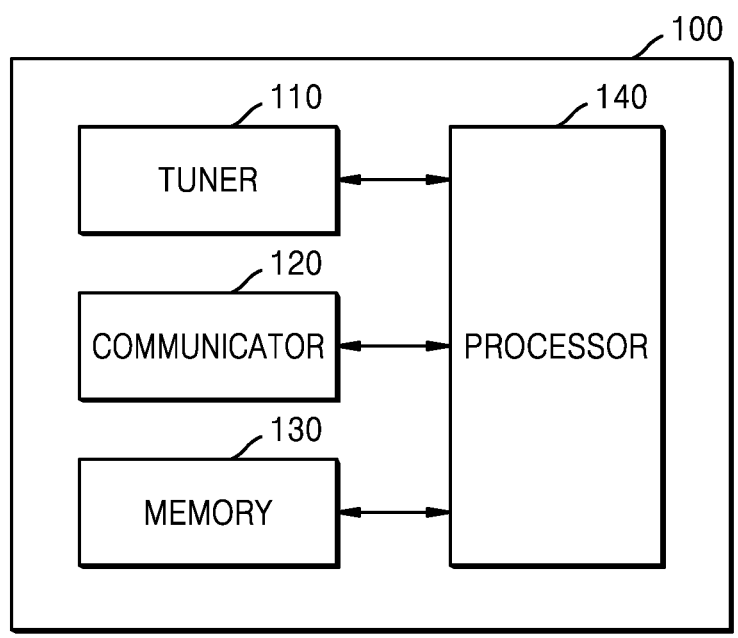
FIG. 9 is a block diagram illustrating an example configuration of a broadcast receiving device according to various embodiments.

FIG. 9 is a block diagram illustrating an example configuration of a broadcast receiving device according to various embodiments.

Referring to FIG. 9, the broadcast receiving device 100 according to an embodiment may include a tuner 110, a communicator (e.g., including communication circuitry) 120, a processor (e.g., including processing circuitry) 140, and a memory 130.

The tuner 110 according to an embodiment may perform amplification, mixing, resonance, etc. on a broadcast signal received in a wired or wireless manner to tune and select only a frequency of a channel that the broadcast receiving device 100 intends to receive from among many radio wave components. The broadcast signal may include audio, video, and additional information (for example, Electronic Program Guide (EPG)).

The tuner 110 may receive a broadcast signal from various sources, such as terrestrial broadcasting, cable broadcasting, satellite broadcasting, Internet broadcasting, etc. The tuner 110 may receive a broadcast signal from a source, such as analog broadcasting, digital broadcasting, etc.

The tuner 110 according to an embodiment may receive SLS. In this case, the SLS may be MMT SLS. The SLS may include a User Service Bundle Description (USBD) fragment and an MMT Package (MP) table. The USBD fragment may provide an identifier of a service and reference information about another SLS required for obtaining components of the corresponding service. Also, the USBD fragment may provide reference information about an MP table, and the MP table may provide information about an MMT protocol session through which the service is transmitted and information about an asset that is transmitted through the MMT protocol session.

The communicator 120 according to an embodiment may include various communication circuitry and transmit and receive data or signals to and from an external device (for example, a control device, a peripheral device, etc.) by a control of the processor 140.

The communicator 120 may transmit and receive data or signals by a method of at least one of a wireless LAN (for example, Wi-Fi), Bluetooth, wired Ethernet, infrared (IR), bluetooth low energy (BLE), ultrasonic waves, zigbee, and HDMI, in correspondence to the performance and structure of the broadcast receiving device 100.

The communicator 120 according to an embodiment may download a Media Presentation Description (MPD). At this time, the communicator 120 may download the MPD using a @fulIMPDUri element of broadbandComponent in a USBD fragment included in SLS. The @fulIMPDUri element may represent a reference for an MPD fragment including descriptions about service components (one or more contents) transmitted through a broadband.

The processor 140 according to an embodiment may include various processing circuitry and execute one or more programs stored in the memory 130. The processor 140 may include a single core, a dual core, a triple core, a quad core, and a multiple core. Also, the processor 140 may include a plurality of processors. For example, the processor 140 may be implemented as a main processor (not shown) and a sub processor (not shown) that operates in a sleep mode.

The memory 130 according to an embodiment may store various data, programs, or applications for driving and controlling the broadcast receiving device 100.

The programs stored in the memory 130 may include one or more instructions. The programs (one or more instructions) or applications stored in the memory 10 may be executed by the processor 140.

The processor 140 according to an embodiment may obtain information of one or more contents of a service from an MP table included in the SLS by executing one or more instructions stored in the memory 130. For example, the MP table may include the number number_of_assets of assets, location information asset_location of assets, and descriptors asset_descriptors for assets.

The processor 140 may determine whether there is second content that is the same as first content being currently received and has a different transfer path from that of the first content, based on the information of the one or more contents. For example, the processor 140 may obtain asset_ location data from the MP table, and determine whether there is second content that is the same as the first content being currently received and is received through a different transfer path from that of the first content, based on location count data included in the asset_location data. When the location_count data is '2' or more, it may refer, for example, to the same content being able to be transmitted through two or more transfer paths, and the processor 140 may determine whether a handoff is possible by determining whether the location_count data is '2' or more.

The processor 140 may check number_of_assets data from the MP table. When the number_of_assets data is '2' or more, it may refer, for example, to information of two or more assets being able to be provided by the MP table. When the number_of_assets data is '2' or more, the processor 140 may determine whether the same content exists, based on descriptors for assets.

When there is the second content that is the same as the first content being currently received and is received through a different transfer path from that of the first content, the processor 140 according to an embodiment may perform a handoff of a content receiving channel from a first transfer path (a path through which the first content is received) to a second transfer path (a path through which the second content is received).

When the second transfer path is a broadband, the processor 140 according to an embodiment may obtain identification information about one or more contents received through the broadband, from the MPD, and identify content matching with the second content from among the one or more contents received through the broadband, based on the identification information and information about the second content. After the content matching with the second content is identified, the processor 140 may perform a handoff of a content receiving channel from the first transfer path to the second transfer path to receive and reproduce the identified content.

Figure 10:
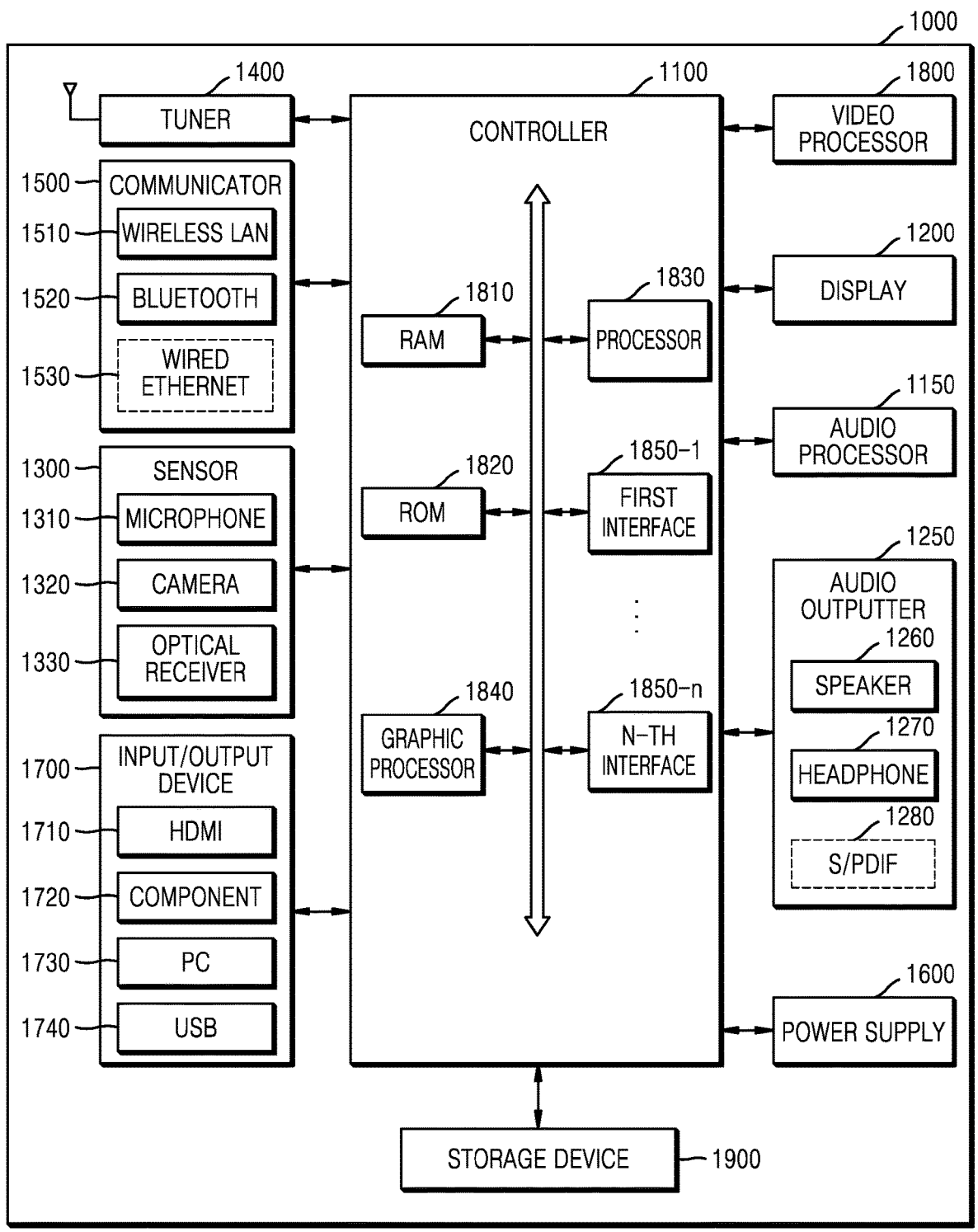
FIG. 10 is a block diagram illustrating an example configuration of a broadcast receiving device according to various embodiments.

FIG. 10 is a block diagram illustrating an example configuration of a broadcast receiving device 1000 according to various embodiments. The broadcast receiving device 1000 of FIG. 10 may be an example of the broadcast receiving device 100 of FIG. 1.

Referring to FIG. 10, the broadcast receiving device 1000 according to an embodiment may include a tuner 1400, a controller (e.g., including processing circuitry) 1100, a display 1200, a communicator (e.g., including communication circuitry) 1500, a sensor 1300, an input/output device 1700, a video processor 1800, an audio processor 1150, an audio outputter 1250, a storage device 1900, and a power supply 1600.

The tuner 1400 of FIG. 10 may correspond to the tuner 110 of FIG. 9, the communicator 1500 of FIG. 10 may correspond to the communicator 120 of FIG. 9, the controller 1100 of FIG. 10 may correspond to the processor 140 of FIG. 9, and the storage device 1900 of FIG. 10 may correspond to the memory 130 of FIG. 9. Therefore, the same descriptions will be omitted.

The communicator 1500 according to an embodiment may include various communication circuitry and transmit and receive data or signals to and from an external device or a server by a control of the controller 1100. The communicator 1500 may transmit and receive data or signals by a method of at least one of a wireless LAN 1510 (for example, Wi-Fi), Bluetooth 1520, wired Ethernet 1530, infrared (IR), bluetooth low energy (BLE), ultrasonic waves, zigbee, and HDMI, in correspondence to the performance and structure of the broadcast receiving device 1000. The controller 1100 may transmit and receive content to and from an external device connected through the communicator 1500, download an application from the external device, or perform web browsing.

The video processor 1800 may process video data received by the broadcast receiving device 1000. The video processor 1800 may perform various kinds of image processing, such as decoding, scaling, noise filtering, frame rate conversion, resolution conversion, etc., on video data.

The sensor 1300 may sense a user's voice, a user's image, or a user's interaction, and may include a microphone 1310, a camera 1320, and an optical receiver 1330.

The microphone 1310 may receive a voice uttered from a user. The microphone 1310 may convert the received voice into an electrical signal, and output the electrical signal to the controller 1100. The user's voice may include, for example, a voice corresponding to a menu or function of the broadcast receiving device 1000.

The camera 1320 may receive an image (for example, successive frames) corresponding to a user's motion including a gesture within a camera recognition range. The controller 1100 may select a menu displayed on the broadcast receiving device 1000 using a received result of motion recognition, or perform a control corresponding to the result of motion recognition.

The optical receiver 1330 may receive an optical signal (including a control signal) from an external control device through a light window (not shown), etc. of a bezel of the display 1200. The optical receiver 1330 may receive an optical signal corresponding to a user input (for example, a touch, pressing, a touch gesture, a voice, or a motion) from a control device. A control signal may be extracted from the received optical signal under the control of the controller 1100.

The input/output device 1700 may receive video (for example, moving images, etc.), audio (for example, voice, music, etc.), and additional information (for example, EPG, etc.) from the outside of the broadcast receiving device 1000 under the control of the controller 1100. The input/output device 1700 may include one of a High Definition Multimedia Interface (HDMI) port 1710, a component jack 1720, a PC port 1730, and a USB port 1740. The input/output device 1700 may include a combination of the HDMI port 1710, the component jack 1720, the PC port 1730, and the USB port 1740.

The controller 1100 may include various processing circuitry and control overall operations of the broadcast receiving device 1000 and signal flow between the internal components of the broadcast receiving device 1000, and process data. When a user input is received or when a predetermined, stored condition is satisfied, the controller 1100 may execute an operating system (OS) and various applications stored in the storage device 1900.

The controller 1100 may include RAM 1810 that stores signals or data received from outside the broadcast receiving device 1000 or is used as a storage area corresponding to various tasks performed by the broadcast receiving device 1000, ROM 1820 storing a control program for controlling the broadcast receiving device 1000, and a processor 1830.

A graphic processor 1840 may create a screen including various objects, such as an icon, an image, text, etc., using a calculator (not shown) and a rendering device (not shown). The calculator may calculate attribute values, such as coordinate values, shapes, sizes, colors, etc., of individual objects, according to a layout of a screen, using a user input sensed through the sensor 1300. The rendering device may create screens of various layouts including the objects, based on the attribute values calculated by the calculator. The screens created by the rendering device may be displayed on a display area of the display 1200.

First to n-th interfaces 1850-1 to 1850-$n$ may be connected to various components described above. One of the interfaces 1850-1 to 1850-$n$ may be a network interface that is connected to an external device through a network.

The RAM 1810, the ROM 1820, the processor 1830, the graphic processor 1840, and the first to n-th interfaces 1850-1 to 1850-$n$ may be connected to each other through an internal bus 1860.

In the current embodiment, the term "controller of a broadcast receiving device" may include the processor 1830, the ROM 1820, and the RAM 1810.

The display 1200 may convert an image signal, a data signal, an OSD signal, a control signal, etc., processed by the controller 1100 to generate a driving signal. The display 1200 may be implemented as a PDP, an LCD, an OLED, a flexible display, etc., and also may be implemented as a 3-dimensional (3D) display. Also, the display 1200 may be configured as a touch screen and used as an inputter as well as an outputter.

The audio processor 1150 may process audio data. The audio processor 1150 may perform various processing, such as decoding, amplification, noise filtering, etc., on audio data. Meanwhile, the audio processor 1150 may include a plurality of audio processing modules for processing audio corresponding to contents.

The audio outputter 1250 may output audio included in a broadcasting signal received through the tuner 1400 by a control of the controller 1100. The audio outputter 1250 may output audio (for example, a voice or sound) received through the communicator 1500 or the input/output device 1700. Also, the audio outputter 1250 may output audio stored in the storage device 1900 by a control of the controller 1100. The audio outputter 1250 may include at least one of a speaker 1260, a headphone output terminal 1270, or a Sony/Philips Digital Interface (S/PDIF) output terminal 1280. The audio outputter 1250 may include a combination of the speaker 1260, the headphone output terminal 1270, and the S/PDIF output terminal 1280.

The power supply 1600 may supply power received from an external power source to internal components of the broadcast receiving device 1000 by a control of the controller 1100. The power supply 1600 may supply power output from a single or one or more batteries (not shown) located inside the broadcast receiving device 1000 to the internal components by a control of the controller 1100.

The storage device 1900 may store various data, programs, or applications for driving and controlling the broadcast receiving device 1000 by a control of the controller 1100. The storage device 1900 may include a broadcast receiving module, a channel control module, a volume control module, a communication control module, a voice recognition module, a motion recognition module, a light receiving module, a display control module, an audio control module, an external input control module, a power control module, a power control module of an external device connected in a wireless fashion (for example, Bluetooth), a voice database (DB), or a motion database (DB), which are not illustrated. The modules (not shown) and databases of the storage device 1900 may be implemented in the form of software (S/W) to perform a broadcast reception control function, a channel control function, a volume control function, a communication control function, a voice recognition function, a motion recognition function, a light reception control function, a display control function, an audio control function, an external input control function, a power control function, or a power control function of an external device connected in a wireless fashion (for example, Bluetooth), in the broadcast receiving device 1000. The controller 1100 may perform the individual functions using the software stored in the storage device 1900.

The block diagrams of the broadcast receiving devices 100 and 1000 illustrated in FIGS. 9 and 10 are block diagrams illustrating various embodiments. Some components included in the individual block diagrams may be integrated or omitted, or another component may be added, according to actual specifications of the broadcast receiving devices 100 and 1000. That is, two or more components may be integrated into one component, or one component may be separated into two or more components, as necessary. Also, functions performed in the individual blocks are provided to describe the embodiments, and the detailed operations or devices for the functions do not limit the scope of rights of the disclosure.

The method of operating the broadcast receiving device according to an embodiment may be embodied in the form of program commands that can be executed through various computing means, and recorded in computer-readable media. The computer-readable media may also include, alone or in combination with the program commands, data files, data structures, and the like. The program commands recorded on the media may be those specially designed and constructed for the present disclosure, or they may be of the kind well-known and available to those having skill in the computer software art. Examples of the computer-readable media may include magnetic media such as hard disks, floppy disks, and magnetic tape; optical media such as a CD-ROM and a DVD; magneto-optical media such as floptical disks; and hardware devices that are specially configured to store and perform program commands, such as ROM, RAM, flash memory, and the like. Examples of the program commands may include both machine code, such as code made by a compiler, and high-level language code executable by the computer using an interpreter.

The method of operating the broadcast receiving device, according to various embodiments, may be included and provided in a computer program product. The computer program product may be traded between a seller and a purchaser as a commodity.

The computer program product may include a S/W program and computer-readable storage media in which the S/W program is stored. For example, the computer program product may include a product in the form of a S/W program (e.g., a downloadable app) that is electronically distributed through a manufacturer of a broadcast receiving device or an electronic marketplace (e.g., Google Play Store or App-Store). For electronic distribution, at least a part of the S/W program may be stored on storage media or may be created temporarily. In this case, the storage media may be storage media of a server of a manufacturer, a server of an electronic marketplace, or a relay server for temporarily storing the SW program.

The computer program product may include, in a system configured with a server and a client device, storage media of the server or storage media of the client device. When there is a third device (e.g., a smartphone) connected and communicating with the server or the client device, the computer program product may include storage media of the third device. The computer program product may include a S/W program itself transmitted from the server to the client device or to the third device, or from the third device to the client device.

In this case, one of the server, the client device, and the third device may execute the computer program product to perform the method according to the disclosed embodiments. Two or more of the server, the client device, and the third device may execute the computer program product to distribute and perform the method according to the disclosed embodiments.

For example, a server (e.g., a cloud server or an artificial intelligence server, etc.) may execute a computer program product stored on the server to control a client device communicatively connected to the server to perform the method according to the disclosed embodiments.

Although various example embodiments have been described in detail, the scope of the disclosure is not limited thereto, and various modifications and improvements apparent to the skilled person using the concepts of the disclosure, including the following claims, are also within the scope of the disclosure.

The invention claimed is:

1. A broadcast receiving device configured to receive a transmitted service using an MPEG Media Transport (MMT) protocol, the broadcast receiving device comprising:
   a tuner configured to receive MMT Service Layer Signaling (SLS);
   a memory storing one or more instructions; and
   a processor configured to execute the one or more instructions stored in the memory and configured to:
      obtain information of one or more contents of the service, from an MMT Package (MP) table included in the MMT SLS, wherein the information of one or more contents comprises at least one of: number_of_assets data, location_count data, and asset_descriptors data included in the MP table,
      determine whether there is second content that is the same as first content being currently received through a first transfer path and received through a different transfer path from the first transfer path of the first content, among the one or more contents, based on the information of the one or more contents, and
      perform a handoff of a content receiving channel from the first transfer path to a second transfer path corresponding to the second content to receive the second content, and
   wherein the number_of_assets data comprises data providing the number of assets of which information is provided by the MP table, the location_count data comprises data providing the number of piece of location information for an asset, and the asset_descriptors data comprises data providing descriptors about assets, and
   wherein the processor is further configured to at least one of:
      determine whether there is the second content by determining whether location count data for the first content is 2 or more, or
      determine whether there is the second content by determining, if the number_of_assets data is 2 or more, whether descriptor data from asset_descriptors for the first asset or descriptor data from asset_descriptors for the second asset includes a description representing that the first asset and the second asset are the same asset.

2. The broadcast receiving device of claim 1, wherein the first transfer path and the second transfer path are any one of a broadcast and a broadband.

3. The broadcast receiving device of claim 1, wherein the processor is configured to identify the second content from among one or more contents received through the second transfer path, and receive the identified content through the second transfer path.

4. The broadcast receiving device of claim 3, wherein the processor is configured to: obtain a reference for a Media Presentation Description (MPD) from a User Service Bundle Description (USBD) fragment included in the MMT SLS,
control a communicator to receive the MPD based on the reference for the MPD, and
obtain identification information for one or more contents received through the second transfer path from the MPD, and identify the second content from among one or more contents received through the second transfer path, based on the identification information and information about the second content.

5. The broadcast receiving device of claim 4, wherein the processor is configured to identify the second content from among the one or more contents received through the second transfer path, based on URL information about the one or more contents included in the MPD and URL information about the second content.

6. The broadcast receiving device of claim 1, wherein the processor is configured to perform the handoff based on a broadcast receiving environment and a user input.

7. A method of operating a broadcast receiving device to receive a transmitted service using an MPEG Media Transport (MMT) protocol, the method comprising:
receiving MMT Service Layer Signaling (SLS);
obtaining information of one or more contents of the service from an MMT Package (MP) table included in the MMT SLS, the information of one or more contents comprising at least one of: number_of_assets data, location_count data, and asset_descriptors data included in the MP table;
determining whether there is second content that is the same as first content being currently received through a first transfer path and received through a different transfer path from the first transfer path of the first content among the one or more contents, based on the information of the one or more contents; and
performing a handoff of a content receiving channel from the first transfer path to a second transfer path corresponding to the second content, and receiving the second content,
wherein the number_of_assets data comprises data providing the number of assets of which information is provided by the MP table, the location_count data comprises data providing the number of pieces of location information for an asset, and the asset_descriptors data comprises data providing descriptors about assets, and,
wherein the determining whether there is second content comprises at least one of:
determining whether there is the second content by determining whether location_count data for the first content is 2 or more, or
determining whether there is the second content by determining, if the number_of_assets data is 2 or more, whether descriptor data from asset_descriptors for the first asset or descriptor data from asset_descriptors for the second asset includes a description representing that the first asset and the second asset are the same asset.

8. The method of claim 7, wherein the first transfer path and the second transfer path are any one of a broadcast and a broadband.

9. A computer program product including one or more non-transitory computer-readable recording media having recorded thereon a program for implementing the method according to claim 7.

10. The method of claim 7, further comprising:
obtaining a reference for a Media Presentation Description (MPD) from a User Service Bundle Description (USBD) fragment included in the MMT SLS,
receiving the MPD based on the reference for the MPD, and
obtaining identification information for one or more contents received through the second transfer path from the MPD, and identifying the second content from among the one or more contents received through the second transfer path, based on the identification information and information about the second content.

11. The method of claim 10, further comprising:
identifying the second content from among the one or more contents received through the second transfer path, based on URL information about the one or more contents included in the MPD and URL information about the second content.

* * * * *